US011724609B2

(12) United States Patent
Erikson et al.

(10) Patent No.: US 11,724,609 B2
(45) Date of Patent: Aug. 15, 2023

(54) CHARGING CABLE TIE-DOWN

(71) Applicant: Rivian IP Holdings, LLC, Plymouth, MI (US)

(72) Inventors: Tyler Erikson, Torrance, CA (US); David Day Lee, Bloomfield Hills, MI (US); Courtney Alex Tamaro, Madison Heights, MI (US); Trent C. Warnke, Novi, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 231 days.

(21) Appl. No.: 17/232,407

(22) Filed: Apr. 16, 2021

(65) Prior Publication Data

US 2022/0332202 A1 Oct. 20, 2022

(51) Int. Cl.
*B60L 53/18* (2019.01)
*H02J 7/00* (2006.01)
*B60L 53/16* (2019.01)

(52) U.S. Cl.
CPC .............. *B60L 53/18* (2019.02); *B60L 53/16* (2019.02); *H02J 7/0045* (2013.01)

(58) Field of Classification Search
CPC .......... B60L 53/18; B60L 53/16; H02J 7/0045
USPC ....................................................... 320/109
See application file for complete search history.

(56) References Cited

U.S. PATENT DOCUMENTS

| | | | |
|---|---|---|---|
| 6,338,450 B1 * | 1/2002 | Schwendinger | B60L 53/31 191/12 R |
| 8,890,475 B1 * | 11/2014 | Becker | B60L 53/66 320/109 |
| 11,014,463 B2 * | 5/2021 | Bianco | H02J 7/0045 |
| 2010/0102775 A1 * | 4/2010 | Chander | B65H 75/4402 242/390.8 |
| 2011/0181241 A1 * | 7/2011 | Badger | H01M 10/486 320/109 |
| 2012/0313580 A1 * | 12/2012 | Charnesky | H01R 13/6397 320/109 |
| 2013/0134933 A1 * | 5/2013 | Drew | B60L 53/31 361/103 |
| 2013/0187601 A1 * | 7/2013 | Petrie | H01R 13/635 320/109 |
| 2013/0257373 A1 * | 10/2013 | Mallon, IV | F16L 3/16 248/65 |

(Continued)

FOREIGN PATENT DOCUMENTS

GB 2434040 A * 7/2007 .......... B65H 75/366

*Primary Examiner* — Suresh Memula
(74) *Attorney, Agent, or Firm* — Clements Bernard Walker; Christopher L. Bernard

(57) ABSTRACT

Disclosed embodiments include apparatuses, systems, and methods for releasably attaching a charging interface (that is coupled to an overhead cable) to a lower surface, thereby helping contribute to limiting unintended movement of the charging interface. In an illustrative embodiment, an apparatus includes a releasable coupling. An upper interface is configured to secure a first end of the releasable coupling to an implement at an end of an overhead cable that extends downwardly from an overhead body. A lower interface is configured to releasably secure a second end of the releasable coupling to a lower surface. The lower interface is configured to release the second end of the releasable coupling responsive to a strain on the lower interface in excess of a release threshold.

20 Claims, 7 Drawing Sheets

(56) References Cited

U.S. PATENT DOCUMENTS

| | | | |
|---|---|---|---|
| 2014/0021915 A1* | 1/2014 | Staley | H02J 7/00 439/153 |
| 2014/0210410 A1* | 7/2014 | Gorenzweig | B60L 53/16 320/109 |
| 2014/0300319 A1* | 10/2014 | Nakajima | B60L 50/66 320/109 |
| 2016/0009191 A1* | 1/2016 | Becker | B60L 53/31 320/152 |
| 2016/0159231 A1* | 6/2016 | Jefferies | B60L 53/60 320/109 |

* cited by examiner

CHARGING CABLE TIE-DOWN

The present disclosure relates to a charging cable for a vehicle.

The statements in this section merely provide background information related to the present disclosure and may not constitute prior art.

Electrically-powered vehicles are charged using a power station that includes a power cable that terminates in a charging interface. The charging interface is couplable with a charging port on the electrically-powered vehicle to replenish the electric charge in batteries aboard the vehicle.

BRIEF SUMMARY

Disclosed embodiments include apparatuses, systems, and methods for releasably attaching a charging interface (that is coupled to an overhead cable) to a lower surface, thereby helping contribute to limiting unintended movement of the charging interface.

In an illustrative embodiment, an apparatus includes a releasable coupling. An upper interface is configured to secure a first end of the releasable coupling to an implement at an end of an overhead cable that extends downwardly from an overhead body. A lower interface is configured to releasably secure a second end of the releasable coupling to a lower surface. The lower interface is configured to release the second end of the releasable coupling responsive to a strain on the lower interface in excess of a release threshold.

In another illustrative embodiment, a system includes an overhead charging source. A charging interface is configured to provide a source of electrical power for an electrically-chargeable vehicle. A charging cable is configured to electrically couple the charging interface to the overhead charging source and to mechanically support the charging interface. A releasable tie-down apparatus includes a releasable coupling. An upper interface is configured to secure a first end of the releasable coupling to the charging interface coupled to the charging cable that extends downwardly from the overhead charging source. A lower interface is configured to releasably secure a second end of the releasable coupling to a lower surface. The lower interface is configured to release the second end of the releasable coupling responsive to a strain on the lower interface in excess of a release threshold.

In a further illustrative embodiment, a method includes attaching a first end of a releasable coupling to a charging interface at an end of a charging cable that extends downwardly from an overhead source of electrical power. A second end of the releasable coupling is releasably attached to a lower surface. The second end of the releasable coupling is configured to be released from the lower surface when a force applied to at least one of the charging interface, the charging cable, and the releasable coupling results in a strain on the lower interface in excess of a release threshold.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

DETAILED DESCRIPTION

The following description is merely illustrative in nature and is not intended to limit the present disclosure, application, or uses. It will be noted that the first digit of the three-digit reference numbers corresponds to the figure number in which the element first appears.

The following description explains, by way of illustration only and not of limitation, various embodiments of apparatuses, systems, and methods for releasably attaching a charging interface (that extends from an overhead cable) to a lower surface, thereby helping contribute to limiting unintended movement of the charging interface.

Figure 1:
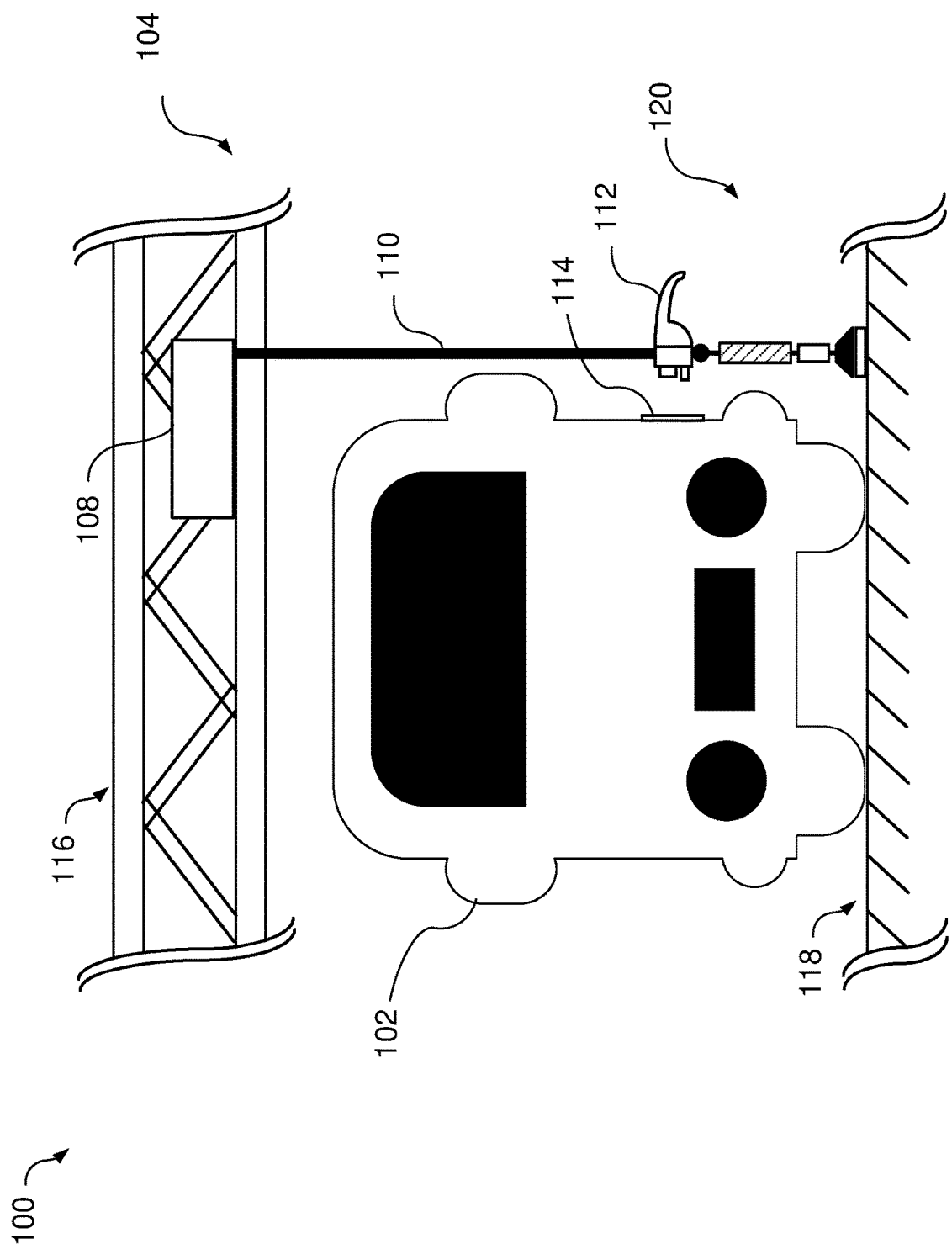
FIG. 1 is a plan view in partial schematic form of an overhead charging station including an illustrative releasable coupling system for securing a charging interface.

Referring to FIG. 1, in various embodiments a charging station 100 for an electrically-chargeable vehicle 102 includes an overhead-mounted charging system 104. The overhead-mounted charging system 104 includes an overhead body such as an overhead charging source 108. The overhead charging source 108 may include an interface to an electrical utility or another power system that is accessible to provide electrical power to the electrically-chargeable vehicle 102. The overhead-mounted charging system 104 also includes an overhead cable such as a charging cable 110. In various embodiments, the charging cable 110 terminates in an implement such as a charging interface 112 that is configured to be coupled to a charging port 114 of the electrically-chargeable vehicle 102. As a result, the overhead-mounted charging system 104 may supply electrical power from the overhead charging source 108 through the charging cable 110 to the charging interface 112 to supply electrical power to charge batteries (not shown) incorporated in the electrically-chargeable vehicle 102. The overhead charging system 104 may be mounted to an overhead structure 116, such as a ceiling of a building, a canopy, or another structure. While in various embodiments the charging cable 110 is described as being configured from an overhead-mounted charging system 104, it is understood that one or more embodiments described herein could be utilized in a charging system of any height, and not necessarily limited to an overhead height, that allows the charging cable 110 to hang therefrom.

In various embodiments, the overhead-mounted charging system 104 saves space on a lower surface 118 of the charging station 100 by obviating the need for one or more floor-mounted charging devices. The lower surface 118 may include the ground, a paved surface, or a floor of a structure.

The overhead-mounted charging system 104 may be configured to place the charging interface 112 in proximity to the charging port 114 of the electrically-powered vehicle 102 to facilitate coupling of the charging interface 112 with the charging port 114. In various embodiments, a tie-down cable system 120 movably couples the charging interface 112 and its associated charging cable 110 to the lower surface 118 to help contribute to limiting unintended movement of the charging interface, as further described below.

Figure 2:
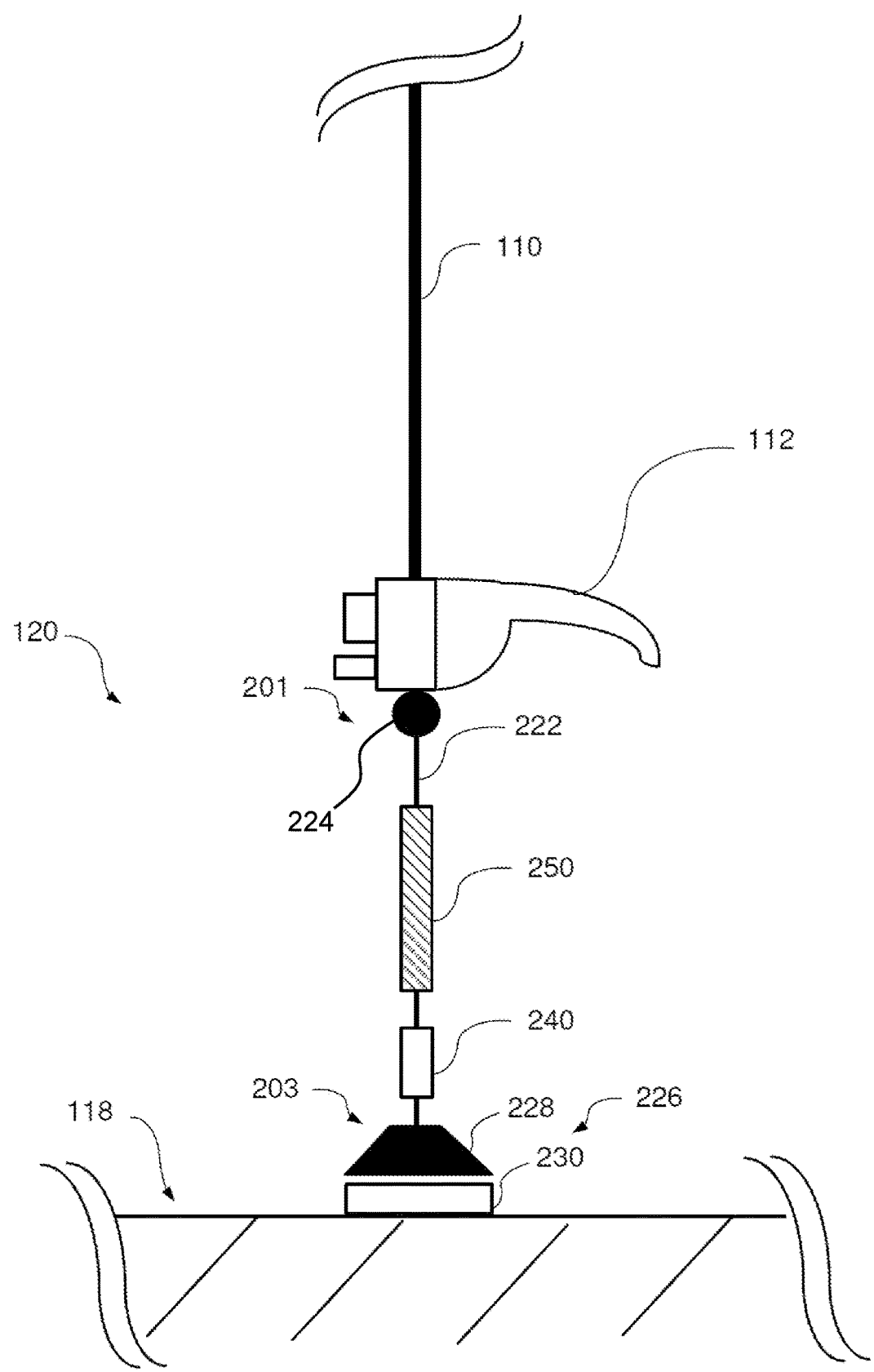
FIG. 2 is a plan view in partial schematic form of details of the releasable coupling system of FIG. 1.

Referring additionally to FIG. 2, in various embodiments the tie-down cable system 120 includes a releasable coupling 222. The releasable coupling may include a cable, strap, cord, rope, wire, or other coupling that is used to secure the charging interface 112, to a lower surface, as further described herein. A first end 201 of the releasable coupling 222 is releasably coupled to the charging interface 112 with an upper interface 224. The upper interface 224 may include a clamp, a strap, a harness, an adhesive device, or another device coupled to the first end 201 of the releasable coupling 222 and that is configured to be secured to the charging interface 112. The upper interface 224 also may include a pivot or swivel to permit rotation of the charging interface 112 relative to the releasable coupling 222 without twisting or torquing the releasable coupling 222.

A second end 203 of the releasable coupling 222 is releasably coupled to the lower surface 118 with a lower interface 226. In various embodiments, the lower interface 226 is made releasable through the use of a first coupling 228 and a second coupling 230 that are releasably interconnected. In various embodiments, the first coupling 228 is coupled to the second end 203 of the releasable coupling 222 and the second coupling 230 is formed in or coupled with the lower surface 118. The first coupling 228 thereby releasably secures the tie-down cable to the second coupling 230 at the lower surface 118.

As further described below, the releasable coupling 222 may also include one or more additional elements to enhance usability. In various embodiments, an extendable element 240 is integrated into or couplable with the releasable coupling 222 to provide a degree of flexibility in coupling the releasable coupling 222 to the lower surface 118 via the lower interface 226, as well as to provide a degree of elasticity in the releasable coupling 222 to absorb a degree of strain. In various embodiments, a high-visibility element 250 is also integrated into or couplable with the releasable coupling 222 to make the releasable coupling 222 more visible to vehicle operators or other persons. The extendable element 240 and the high-visibility element 250 are described further below with reference to FIGS. 7A and 7B.

Figure 3B:
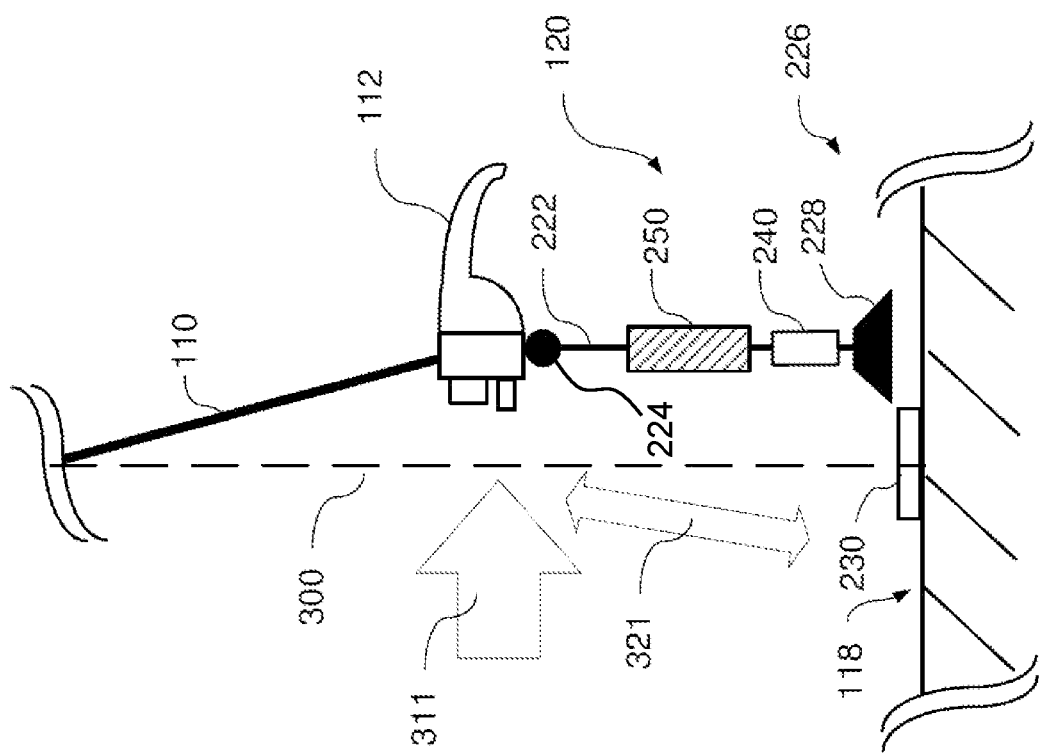
FIGS. 3A and 3B are plan views in partial schematic form of the releasable coupling of FIG. 1 maintaining a position of the charging interface and releasing the charging interface, respectively, in response to a strain applied to the releasable coupling.
Figure 3A:
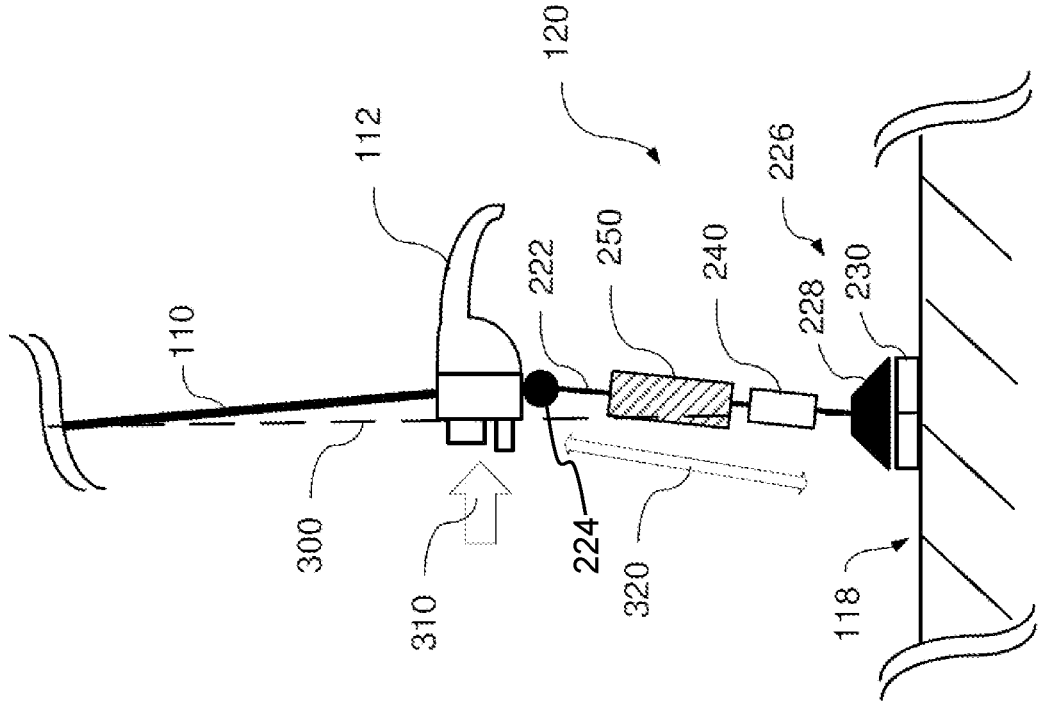

Referring additionally to FIGS. 3A and 3B, in various embodiments the lower interface 226 is configured to be releasable from the lower surface 118 when a force is applied to the charging cable 110, the charging interface 112, or the releasable coupling 222 that results in a strain on the lower interface 226 that exceeds a predetermined release threshold. As a result, the tie-down cable system 120 holds the charging cable 110 and the charging interface 112 along or close to a vertical line 300 extending from the overhead structure 116 (FIG. 1) until a force is applied that results in a strain that causes the lower interface 226 to release.

For example, when a wind blows against the charging cable 110 and/or the charging interface 112, or a person brushes against the charging cable 110 and/or the charging interface 112, it may be desirable for the tie-down cable system 120 to hold the charging cable 110 and the charging interface 112 generally in place. As a result, this small force on the charging cable 110 and/or the charging interface 112 will not release the lower interface 226 so as to allow the charging interface 112 to swing free and impact a vehicle or person. However, when a stronger force is exerted against the charging cable 110 and/or the charging interface 112, such as by a vehicle driving into the charging cable 110 or a person stumbling directly into the charging interface 112, it may be desirable to release the lower interface 226 so that the vehicle or the person are not harmed. Furthermore, releasing the lower interface 226 may help limit or prevent damage to the charging cable 110 and the charging interface 112 that may result if the charging cable 110 and the charging interface 112 were rigidly held in place when impacted by a large force.

As shown in FIG. 3A, the charging cable 110 and/or the charging interface 112 are impacted by a first force 310 that results in a first strain 320 being exerted on the lower interface 226. The first force 310 may result in the first strain 320 on the lower interface 226 being less than a predetermined release threshold. As a result, the first coupling 228 and the second coupling 230 remain engaged with each other to prevent the lower interface 226 from releasing the releasable coupling 222. By contrast and as shown in FIG. 3B, the charging cable 110 and/or the charging interface 112 may be impacted by a second force 311 that results in a second strain 321 being exerted on the lower interface 226 that exceeds the predetermined release threshold. As a result, the first coupling 228 releases from the second coupling 230 to release the releasable coupling 222 to help limit or prevent damage to the charging cable 110 and charging interface 112 or other property and/or to help prevent injuries to nearby persons.

Figure 4A:
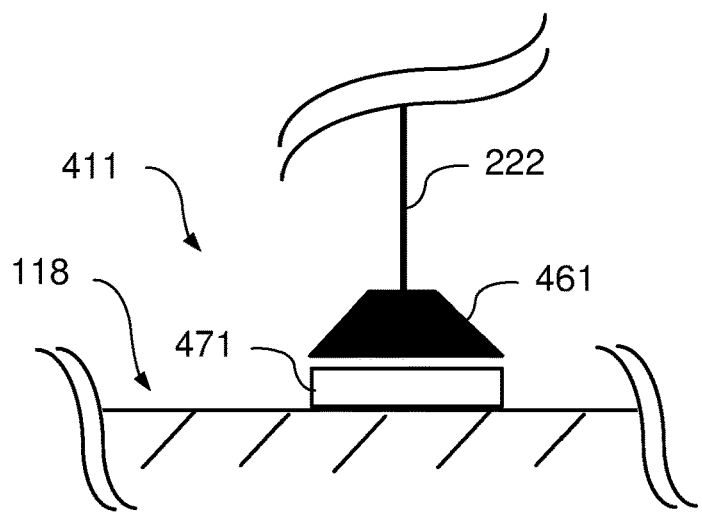
FIGS. 4A-4C, 5, 6A and 6B are plan views in partial schematic form of illustrative lower interfaces for coupling a releasable coupling to a lower surface.

The first coupling 226 and the second coupling 228 of the lower interface 226 may be manifested in numerous ways to enable the tie-down cable system 120 to hold the charging cable 110 and charging interface 112 in place until a strain in excess of a release threshold is reached. For example, referring additionally to FIGS. 4A-4C, the lower interface 226 may include magnetic couplings. As shown in FIG. 4A, a first magnetic lower interface 411 may include a magnet 461 deployed as the first coupling that is attracted to a magnetically-attractive metal base 471 deployed as the second coupling. The magnet 461 is configured to remain magnetically secured to the magnetically-attractive metal base 471 until a strain in excess of the release threshold is applied to the magnet 461 by the releasable coupling 222 to pull the magnet 460 away from the magnetically-attractive metal base 471.

Figure 4B:
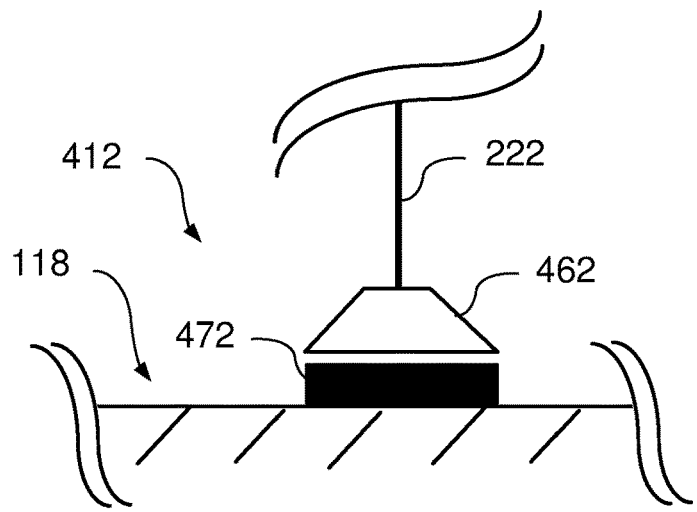

As shown in FIG. 4B, a second magnetic lower interface 412 may include a magnetically-attractive metal body 462 deployed as the first coupling and that is attracted by a magnet 472 deployed as the second coupling. The magnetically-attractive metal body 462 is configured to remain magnetically secured to the magnet 472 until a strain in excess of the release threshold is applied to the magnetically-attractive metal body 462 by the releasable coupling 222 to pull the magnetically-attractive metal body 462 away from the magnet 472.

Figure 4C:
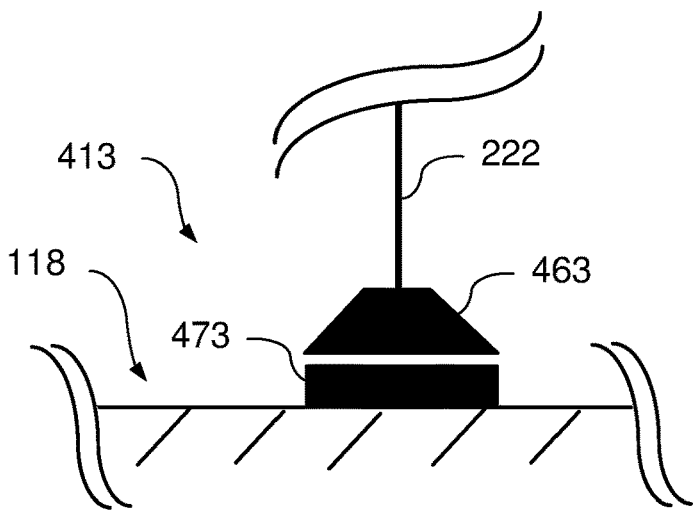

As shown in FIG. 4C, a third magnetic lower interface 413 may include a first magnet 463 deployed as the first coupling that is attracted to a second magnet 473 deployed as the second coupling. It will be appreciated that the first magnet 463 and the second magnet 473 are oriented so that opposite magnetic poles of the first magnet 463 and the second magnet 473 face one another to facilitate magnetic attraction between opposing poles. The first magnet 463 and the second magnet 473 are configured to remain magnetically secured to each other until a strain in excess of the release threshold is applied to the first magnet 463 by the releasable coupling 222 to pull the first magnet 462 away from the second magnet 472. It will be appreciated that the second coupling may be installed into or onto the lower surface 118 using fasteners or adhesives appropriate to the nature of the second coupling and the lower surface 118 to hold the second coupling in place in or at the lower surface.

Figure 5:
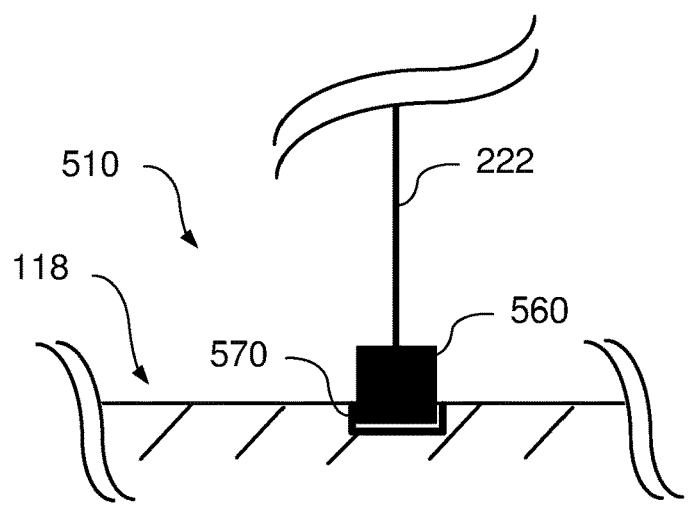

The lower interface 226 also may use mechanical couplings rather than magnetic forces to secure the releasable coupling 222 to the lower surface. Referring additionally to FIG. 5, a lower interface 510 may include a deformable plug 560 as a first coupling that is configured to be receivable within a socket 570 as a second coupling. As with the previously-described couplings, the deformable plug 560 may be configured to remain secured within the socket 570 until a strain in excess of the release threshold is applied to the deformable plug by the releasable coupling 222. The socket 570 may be formed in the lower surface 118 or the socket 570 may be a receptive fastener that is securable to the lower surface 118.

Figure 6A:
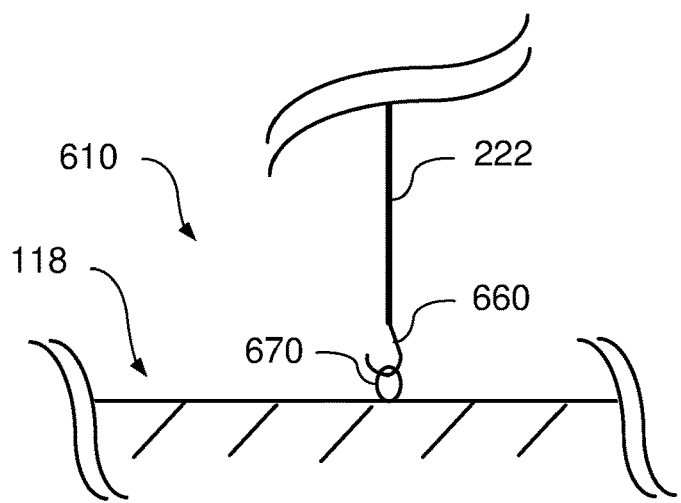
Figure 6B:
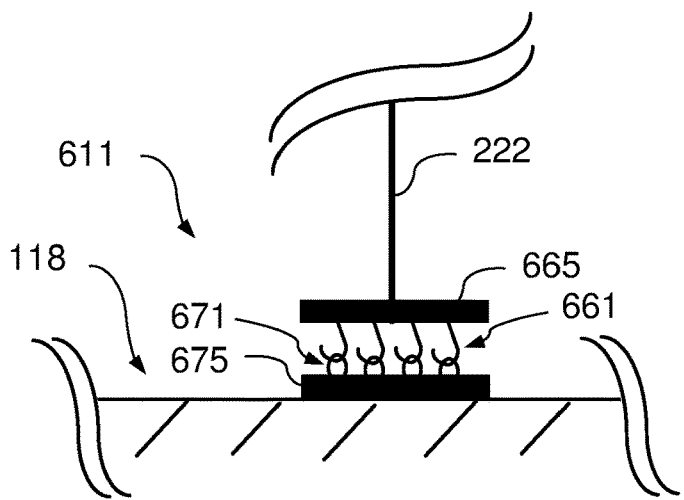

Referring additionally to FIG. 6A, a lower interface 610 may include a deformable hook 660 as a first coupling that is configured to be linked with a loop 670 as a second coupling. The deformable hook 660 may be configured to retain its hook shape and, thus, main secured to the loop 670 until a strain in excess of the release threshold is applied to the deformable hook 660 by the releasable coupling 222. In response to the application of a strain in excess of the release threshold, the deformable hook 660 may straighten and, thus, slip from the loop 670. Referring additionally to FIG. 6B, a lower interface 611 may include a number of deformable hooks 661 extending from a base 665 coupled to the releasable coupling 222 as a first coupling. The deformable hooks 661 are is configured to be linked with a number of loops 671 extending from a base 675 coupled to the lower surface 118 as a second coupling. The deformable hooks 661 and loops 671 thus operate as a hook-and-loop fastener to secure the releasable coupling 222 until a strain in excess of the release threshold is applied.

Figure 7A:
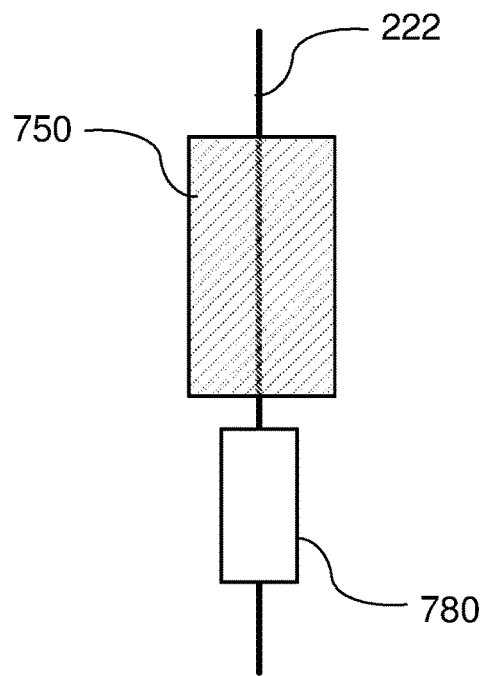
FIGS. 7A and 7B are plan views in partial schematic form of illustrative releasable couplings including an extendable element.
Figure 7B:
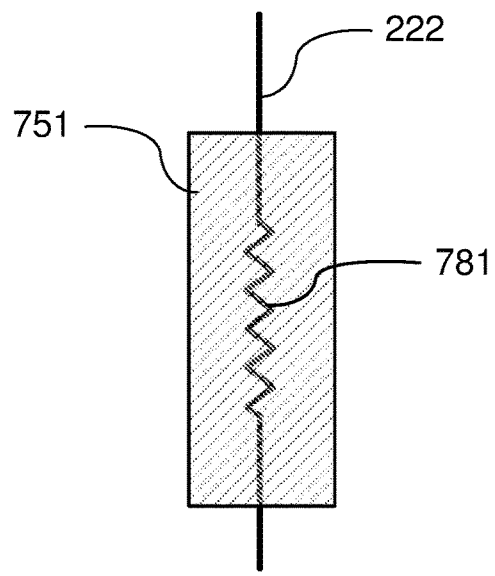

Referring additionally to FIGS. 7A and 7B, as previously described with reference to FIG. 2, the releasable coupling 222 may include an extendable element 240. In various embodiments, the purpose of the extendable element 240 is to provide a degree of flexibility in coupling the releasable coupling 222 to the lower surface 118 via the lower interface 226 (FIG. 2). The inclusion of the extendable element also may provide a degree of elasticity in the releasable coupling 222 to absorb a degree of strain. For example, if a vehicle or a passerby lightly bumps the releasable coupling 222, the extendable element 240 may enable the releasable coupling 222 to remain secured to the lower surface 118. As shown in FIG. 7A, the releasable coupling 222 may include an elastic segment 780 as an extendable element to enable stretching of the releasable coupling 222. As shown in FIG. 7B, the releasable coupling 222 may include a spring 781 as an extendable element to enable stretching of the releasable coupling 222.

Referring additionally to FIGS. 7A and 7B, as also previously described with reference to FIG. 2, the releasable coupling 222 may include a high visibility element 250. In various embodiments, the purpose of the high-visibility element 250 is to make the releasable coupling 222 easier for vehicle operators and passersby to see to assist them in avoiding bumping into and/or dislodging the releasable coupling 222. The high-visibility element 250 may include a flexible or rigid material that is of a bright color, such as a day-glow orange and/or yellow commonly used in safety garments and warning structures such as cones, barricades, and similar structures. The high-visibility element 250 also may include reflective or semi-reflective materials as also used in safety garments and used in safety garments and warning structures such as cones, barricades, and similar structures. As shown in FIG. 7A, the releasable coupling 222 may include an attachable high-visibility element 750 that is integrated into the releasable coupling 222 or attached to the releasable coupling 222. As shown in FIG. 7B, the releasable coupling 222 may a high-visibility element 751 that slips over the releasable coupling 222 and the spring 781. It will be appreciated that the releasable coupling 222 may include one of the extendable element 240, and the high-visibility element 250 or the releasable coupling 222 may include both the extendable element 240 and the high-visibility element 250. Further, the extendable element 240 and the high-visibility element 250 may overlap or be integrated into a single element to fulfill the purposes of both.

Figure 8:
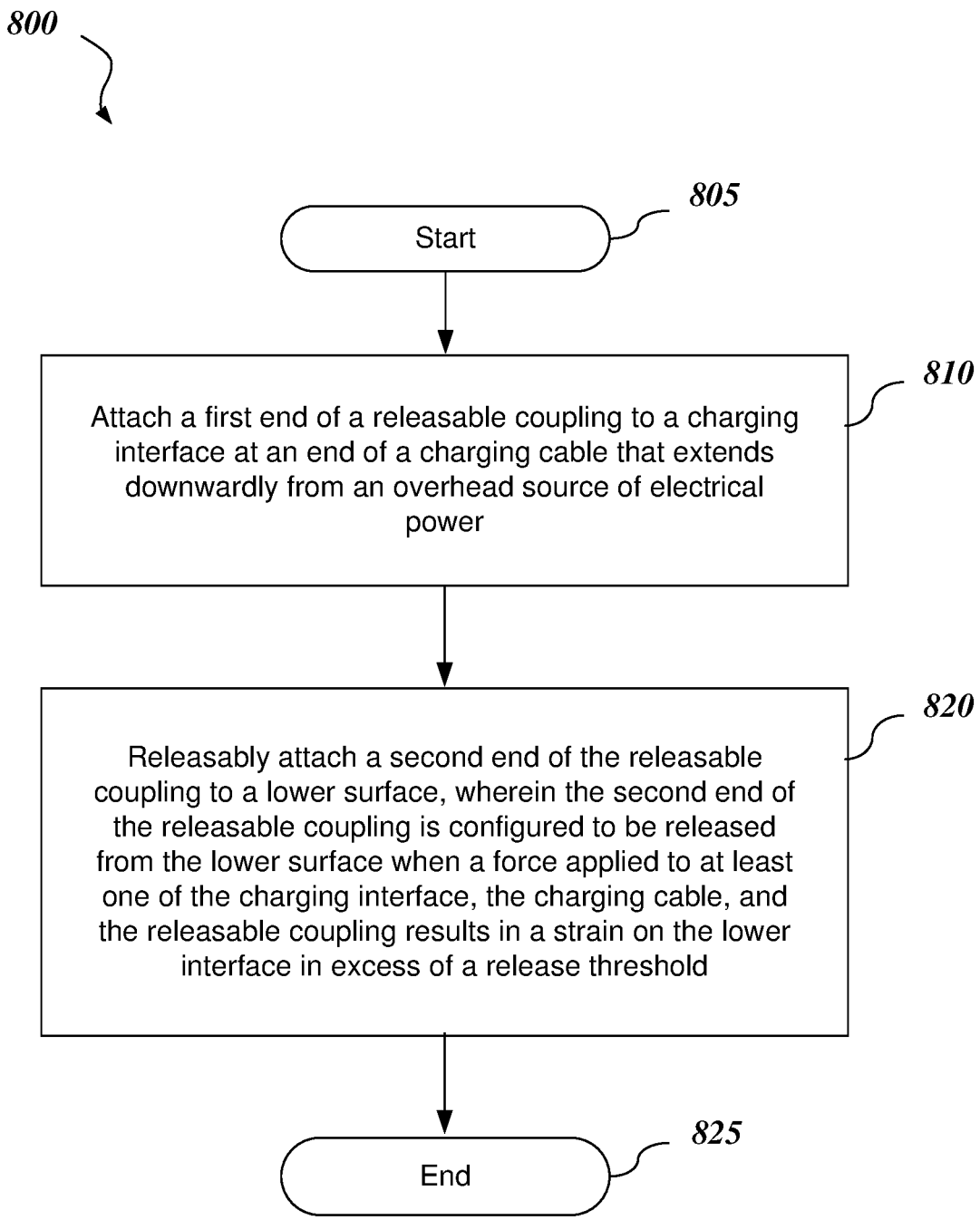
FIG. 8 is a flow chart of an illustrative method of releasably attaching a charging interface to a lower surface.

Referring additionally to FIG. 8, an illustrative method 800 of releasably attaching a charging interface coupled to an overhead cable to a lower surface is provided. The method 800 starts at a block 805. At a block 810, a first end of a tie-down cable is attached to a charging interface at an end of a charging cable that extends downwardly from an overhead source of electrical power. At a block 820, a second end of the tie-down cable is releasably attached to a lower surface, wherein the second end of the tie-down cable is configured to be released from the lower surface when a force applied to at least one of the charging interface, the charging cable, and the tie-down cable results in a strain on the lower interface in excess of a release threshold. The method 800 ends at a block 825.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. An apparatus comprising:
    a releasable coupling;
    an upper interface configured to secure a first end of the releasable coupling to an implement at an end of an overhead cable that extends downwardly from an overhead body; and
    a lower interface configured to releasably secure a second end of the releasable coupling to a lower surface, wherein the lower interface is configured to release the second end of the releasable coupling responsive to a strain on the lower interface in excess of a release threshold.

2. The apparatus of claim 1, wherein the strain is generated responsive to force applied to at least one object chosen from the implement, the overhead cable, and the releasable coupling.

3. The apparatus of claim 1, wherein the implement includes a charging interface, the overhead cable includes a charging cable, and the overhead body includes an overhead charging source.

4. The apparatus of claim 1, wherein the lower interface includes a first coupling configured to be releasably secured to a second coupling at the lower surface.

5. The apparatus of claim 4, wherein the first coupling includes a first magnet and the second coupling includes a magnetically-attractive object.

6. The apparatus of claim 5, wherein the magnetically-attractive object includes an object chosen from a magnetically-attractive metal object and a second magnet presenting a second magnetic pole opposite to the first magnetic pole of the first magnet.

7. The apparatus of claim 4, wherein the first coupling includes a deformable plug and the second coupling includes a socket configured to receive the deformable plug.

8. The apparatus of claim 4, wherein the first coupling and the second coupling include at least one deformable hook and at least one loop.

9. The apparatus of claim 1, wherein the releasable coupling includes at least one additional element chosen from an extendable element and a high-visibility element.

10. A system including:
    an overhead charging source;
    a charging interface configured to provide a source of electrical power for an electrically-chargeable vehicle;
    a charging cable configured to be electrically couple the charging interface to the overhead charging source and to mechanically support the charging interface; and
    a releasable tie-down apparatus including:
        a releasable coupling;
        an upper interface configured to secure a first end of the releasable coupling to the charging interface coupled to the charging cable that extends downwardly from the overhead charging source; and
        a lower interface configured to releasably secure a second end of the releasable coupling to a lower surface, wherein the lower interface is configured to release the second end of the releasable coupling responsive to a strain on the lower interface in excess of a release threshold.

11. The system of claim 10, wherein the lower surface includes a parking surface for the electrically-chargeable vehicle.

12. The system of claim 10, wherein the strain is generated responsive to force applied to at least one object chosen from the charging interface, the charging cable, and the releasable coupling.

13. The system of claim 10, wherein the lower interface includes a first coupling configured to be releasably secured to a second coupling at the lower surface.

14. The system of claim 13, wherein the first coupling includes a first magnet and the second coupling includes a magnetically-attractive object.

15. The system of claim 14, wherein the magnetically-attractive object includes an object chosen from a magnetically-attractive metal object and a second magnet presenting a second magnetic pole opposite to the first magnetic pole of the first magnet.

16. The system of claim 13, wherein the first coupling includes a deformable plug and the second coupling includes a socket configured to receive the deformable plug.

17. The system of claim 13, wherein the first coupling and the second coupling include at least one deformable hook and at least one loop.

18. The system of claim 10, wherein the releasable coupling includes at least one additional element chosen from an extendable element and a high-visibility element.

19. A method comprising:
attaching a first end of a releasable coupling to a charging interface at an end of a charging cable that extends downwardly from an overhead source of electrical power; and
releasably attaching a second end of the releasable coupling to a lower surface, wherein the second end of the releasable coupling is configured to be released from the lower surface when a force applied to at least one of the charging interface, the charging cable, and the releasable coupling results in a strain on the lower interface in excess of a release threshold.

20. The method of claim 19, wherein releasably attaching the second end of the releasable coupling includes attaching the second end of the releasable coupling with corresponding attachment devices at the second end of the releasable coupling and the lower surface.

\* \* \* \* \*